United States Patent [19]

Urano et al.

[11] Patent Number: 4,687,185
[45] Date of Patent: Aug. 18, 1987

[54] TOOL FOR SUPPORTING A COMPOSITE CAMSHAFT DURING SINTERING

[75] Inventors: Shigeru Urano, Omiya; Shunsuke Takeguchi, Tochigi, both of Japan

[73] Assignee: Nippon Piston Ring Co., Ltd., Japan

[21] Appl. No.: 873,947

[22] Filed: Jun. 13, 1986

[30] Foreign Application Priority Data

Jun. 14, 1985 [JP] Japan .............................. 60-88954[U]

[51] Int. Cl.⁴ ......................... F27D 5/00; F27D 15/00
[52] U.S. Cl. .................................. 266/274; 266/287; 432/253; 248/49; 248/68.1
[58] Field of Search .............. 248/49, 68.1, 637, 671, 248/678; 266/274, 287; 432/234, 253, 261

[56] References Cited

U.S. PATENT DOCUMENTS 3,988,107 10/1976 Koch .................................. 432/253

Primary Examiner—Melvyn J. Andrews
Assistant Examiner—George Wyszomierski
Attorney, Agent, or Firm—Birch, Stewart, Kolasch & Birch

[57] ABSTRACT

A tool for supporting a composite camshaft having a steel shaft and a sintered piece to be joined to the steel shaft through sintering in a sintering furnace. The tool comprises a graphite frame having at least two sides, in an upper portion of which a groove means is formed. A ceramic layer is provided on a surface of the groove means. When sintering is performed using such a tool, the tool will not deform even if the tool is exposed to an environment of high temperature, such as the temperature higher than 1,100° C., and therefore, bending of the composite camshaft will not occur during sintering. In addition, the ceramic layer prevents diffusion of carbon from the graphite frame to the steel shaft of the composite camshaft, and therefore, a hardening of the steel shaft due to carbonizing will not occur. As a result, reliability of the joint between the sintered piece and the steel shaft is increased.

12 Claims, 4 Drawing Figures

TOOL FOR SUPPORTING A COMPOSITE CAMSHAFT DURING SINTERING

BACKGROUND OF THE INVENTION

1. Field of the Invention:

The present invention relates to a tool for supporting a composite camshaft having a steel shaft and a sintered piece while the sintered piece is joined to the steel shaft through sintering in a sintering furnace.

2. Description of the Prior Art:

A composite camshaft having a steel shaft and sintered elements, such as a cam, a journal, a gear and a fitting means for a spanner, is well known. Japanese Utility Model Publication No. SHO 51-7367 discloses a composite camshaft of this kind, in which at least a cam and a journal is constructed as a sintered element and is joined to the steel shaft through sintering.

When a sintered piece is joined to a steel camshaft, the sintered piece is first fitted to the steel shaft and then is integrally joined with the steel shaft through diffusion between the sinter and the steel shaft under heating in a sintering furnace. When such sintering is done in a sintering furnace, a tool for supporting a plurality of camshafts to be sintered has been used and usually a plurality of such tools are piled in a vertical direction to make maximum use of the limited space in the furnace.

Such a tool for supporting the composite camshaft to be sintered has been made of steel because of its economical cost. The steel tool used for supporting composite camshafts has generally been composed of a rectangular steel frame having opposed sides containing grooves and the composite camshaft to be sintered is supported by the opposed sides with its steel shaft portion being in direct contact with the steel frame.

However, the conventional tool with a steel frame tends to deform when it is exposed to an environment of high temperatures, such as a temperature of more than 1,100° C. which exists in the furnace. As a result, such a deformation of the steel tool has made it difficult to use the tool repeatedly as well as giving undesirable influences to the quality of the camshaft itself. Such undesirable influences include a bending of the camshaft, a dislocation of the cam and/or the journal to be sintered with respect to the steel shaft in the axial direction of the camshaft, and a degrading of the joining strength and the matrices of the joint between the sintered piece and the steel shaft.

SUMMARY OF THE INVENTION

An object of the present invention is to provide a tool for supporting a composite camshaft to be sintered in a sintering furnace, which can prevent the composite camshaft from bending during sintering and from degrading the joint between the sintered piece and the steel shaft.

The above object can be achieved, according to the present invention, by providing a tool for supporting a composite camshaft during sintering, which tool comprises (1) a frame having at least two sides which oppose each other, the frame being constructed of graphite, (2) a groove means formed in an upper portion of each of the two sides, the composite camshaft to be sintered being supported in the groove means formed in the two sides, and (3) a ceramic layer provided on a surface of the groove means.

According to the tool thus constructed, the frame does not deform under the environment of high temperatures in the sintering furnace, because the frame is constructed of graphite. In addition, since the ceramic layer is provided on the surface of the groove means, the steel shaft of the composite camshaft is not brought into direct contact with the graphite frame and thus diffusion of graphite into steel does not occur.

BRIEF DESCRIPTION OF THE DRAWINGS

These and other objects and advantages of the invention will become apparent and more readily appreciated from the following detailed description of the presently preferred exemplary embodiments of the invention taken in conjunction with the accompanying drawings, wherein.

DESCRIPTION OF THE PREFERRED EMBODIMENTS

Figure 1:
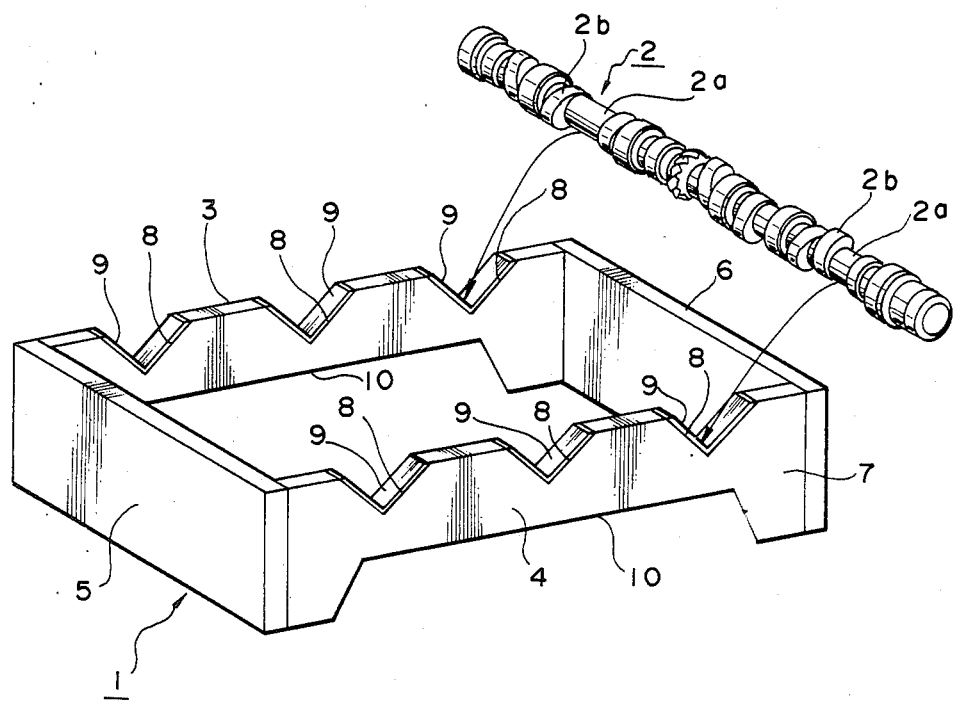
FIG. 1 is a perspective view of a tool for supporting a composite camshaft during sintering according to one embodiment of the present invention.

FIG. 1 shows a tool 1 according to one embodiment of the present invention and a composite camshaft 2 to be supported by tool 1. Tool 1 for supporting camshaft 2 is constructed of graphite and has two sides 3 and 4 which are positioned opposed to each other and extend parallel to each other. Two sides 3 and 4 are formed in a plate-like manner, with the width extending in a vertical direction. Two sides 3, 4 are connected to each other by two connecting sides 5 and 6 which are at a right angle with respect to sides 3 and 4. The four sides 3, 4, 5 and 6 constitute a rectangular frame 7.

Composite camshaft 2 to be sintered is supported by sides 3 and 4 such that composite camshaft 2 extends over sides 3 and 4. A groove means 8 is formed in an upper portion of each of sides 3 and 4. Composite camshaft 2 is supported in groove means 8 of sides 3 and 4. A plurality of groove means 8 may be formed in each of sides 3 and 4 by the number of composite camshafts 2 to be supported by one frame 7 during sintering. When composite camshaft 2 is engaged in groove means 8, composite camshaft 2 is prevented from dislocating in a longitudinal direction of sides 3 and 4 with respect to frame 7.

In the embodiment of FIG. 1, groove means 8 is constructed of a notch having a V shape. However, the shape of groove means 8 is not limited to the V-letter and groove means 8 may have another shape, such as a U-shaped notch, if the notch can receive one portion of composite camshaft 2 therein.

Figure 3:
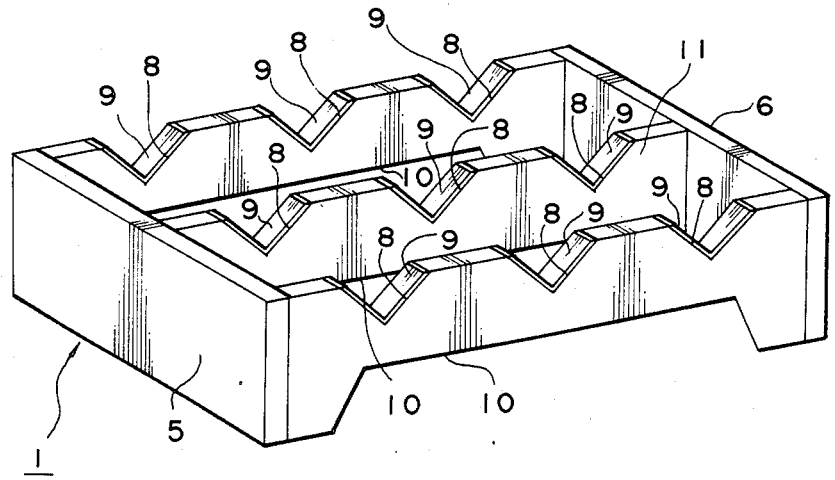
FIG. 3 is a perspective view of a tool for supporting a composite camshaft during sintering according to another embodiment of the present invention.

Though FIG. 1 shows tool 1 having two sides 3 and 4 to support composite camshaft 2 thereon, tool 1 may further comprise at least one intermediate member 11 to support composite camshaft 2 thereon as shown in the embodiment of FIG. 3 for the purpose of preventing composite camshaft 2 from bending downward due to the weight thereof, in the case where composite camshaft 2 is a long camshaft. In case that composite camshaft 2 is a short one, such an intermediate member 11 will not be required. Intermediate member 11 is located between sides 3 and 4 and extends in parallel with sides 3 and 4. Intermediate member 11 has a groove means 8 which is of the same construction as groove means 8 formed in sides 3 and 4 with respect to the shape and the position in the longitudinal direction of sides 3 and 4. Therefore, the same reference numeral as that of groove 8 formed in sides 3 and 4 is used for the groove formed in intermediate member 11. In such tool 1 having intermediate member 11, composite camshaft 2 is supported not only by sides 3 and 4 but also by intermediate member 11.

Figure 2:
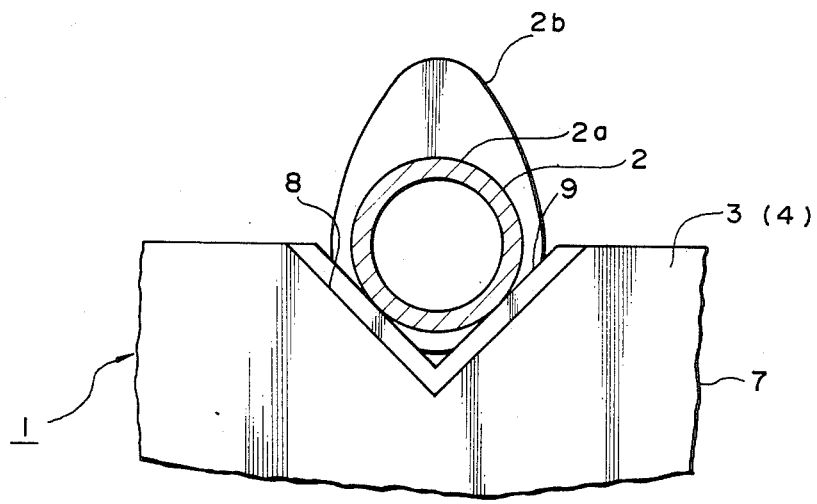
FIG. 2 is a partial elevational view of the tool of FIG. 1 at the vicinity of a groove means.

A ceramic layer 9 is provided on a surface of groove means 8 formed in two sides 3 and 4 and intermediate member 11 as shown in FIG. 2 and FIG. 3. Ceramic layer 9 is a coated ceramic layer, a flame coated ceramic layer or a ceramic piece bonded to the surface of groove means 8.

Figure 4:
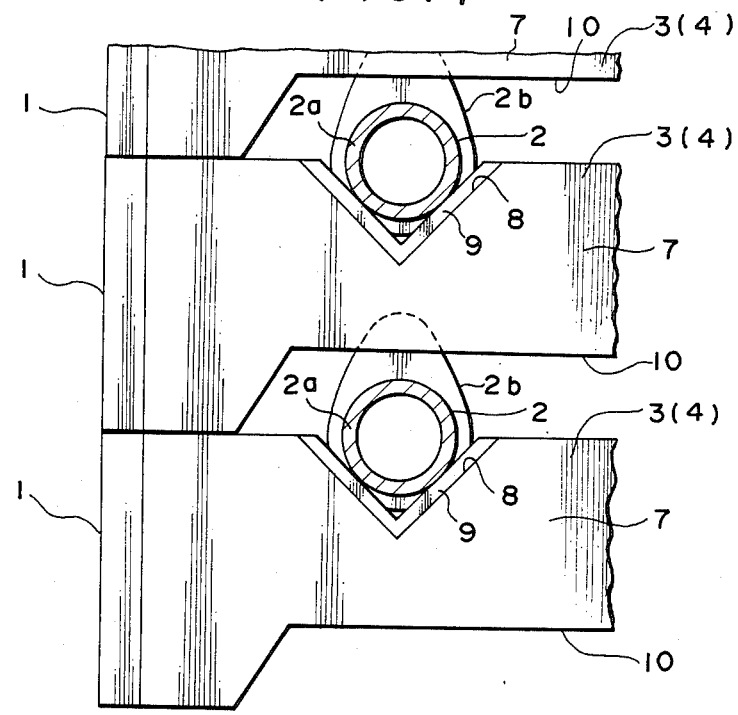
FIG. 4 is a partial elevational view of the tool of FIG. 1 or FIG. 2 when a plurality of the tools are piled in a vertical direction.

A lower portion of each of sides 3 and 4 having groove means 8 in the upper portion thereof is cut upward to form a cut portion 10 as shown in FIG. 1. In the case where tool 1 has intermediate member 11, cut portion 10 is formed in a lower portion of intermediate member 11 as shown in FIG. 3, too. When a plurality of tools 1 are piled in a vertical direction as shown in FIG. 4, cut portion 10 of upper tool 1 can receive one portion of composite camshaft 2 which protrudes upward from a plane including upper surfaces of two sides 3 and 4, and an upper surface of intermediate member 11 when intermediate member 11 is provided, of lower tool 1. As a result, composite camshaft 2 is prevented from interfering with tool 1 when tools 1 are vertically disposed on top of each other.

Next, the use of tool 1 during sintering of composite camshaft 2 will be explained.

Composite camshaft 2 to be sintered has a shaft 2a which is constructed of steel, for example, a steel pipe and at least one sintered piece 2b fitted onto the outside surface of shaft 2a. In the fitted condition, sintered piece 2b is not yet fixed to shaft 2a. Then composite camshaft 2 to be sintered is placed in groove means 8 formed in sides 3 and 4 of frame 7, and a plurality of tools 1 are piled in an up-and-down (vertical) direction and inserted into a sintering furnace where sintered piece 2b is integrally joined to shaft 2a of steel through diffusion by sintering. In this instance, although the gas temperatures within the sintering furnace is higher than 1,100° C., tool 1 does not deform even if it receives the weight of composite camshaft 2, because frame 7 is constructed of graphite and tool 1 can endure the high temperatures. As a result, no bending of composite camshaft 2 and no dislocation of sintered piece 2b will occur, whereby reliability of the joint between sintered piece 2b and steel shaft 2a is increased in strength and matrices If composite camshaft 2 is supported by tool 1 at sintered piece 2b, sintered piece 2b will dislocate in the longitudinal direction of composite camshaft 2 due to the difference in thermal expansion between shaft 2a and frame 7. Therefore, composite camshaft 2 to be sintered should be supported by tool 1 at the portion of steel shaft 2a. In this instance, if steel shaft 2a is brought into direct contact with the graphite frame, a diffusion of carbon from the graphite of frame 7 to the steel of steel shaft 2a will occur and a hardening of shaft 2a will occur at a portion near to the surface of shaft 2a. However, since steel shaft 2a is supported by frame 7 via ceramic layer 9 and thus direct contact of steel shaft 2a with frame 7 of the graphite is prevented, according to the present invention, no hardening of steel shaft 2a due to carbonizing will occur.

Therefore, according to the present invention, the effects such as prevention of a deforming of composite camshaft 2, a dislocation of sintered piece 2b along shaft 2a and a hardening of steel shaft 2a can be obtained.

Although only a few exemplary embodiments of the present invention have been described in detail above, those skilled in the art will readily appreciate that many modifications are possible in the exemplary embodiments without materially departing from the novel teachings and advantages of the invention. Accordingly, all such modifications are intended to be included within the scope of the present invention as defined in the following claims.

What is claimed is:

1. A tool for supporting a composite camshaft during sintering, the composite camshaft having a shaft of steel and a sintered piece to be joined to the shaft through sintering, said tool, comprising:
   a frame having at least two sides extending parallel and opposed to each other, said frame being constructed of graphite;
   a groove means formed in an upper portion of each of said two sides for receiving one portion of said composite camshaft to be sintered; and
   a ceramic layer provided on a surface of said groove means.

2. The tool of claim 1, wherein said two sides are constructed in a plate-like member, the width of which extends in a vertical direction.

3. The tool of claim 1, wherein said two sides are connected to each other by two connecting sides extending at a right angle with respect to said two sides.

4. The tool of claim 1, wherein said groove means are formed in each of said two sides based on the number of the composite camshafts to be supported on said two sides.

5. The tool of claim 1, wherein said groove means is constructed of a notch having a V shape.

6. The tool of claim 1, wherein said groove means is constructed of a notch having a U shape.

7. The tool of claim 1, wherein said ceramic layer is a coated ceramic layer.

8. The tool of claim 1, wherein said ceramic layer is a flame coated ceramic layer.

9. The tool of claim 1, wherein said ceramic layer is a ceramic piece bonded to the surface of said groove means.

10. The tool of claim 1, wherein each of said two sides has a cut portion in the lower portion thereof, said cut portion being cut upward such that, when a plurality of said tools are piled on top of each other in a vertical direction, the cut portion formed in the upper tool receives therein one portion of the composite camshaft being supported by the lower tool, protruding upward from a plane including the upper surfaces of the two sides of the lower tool.

11. The tool of claim 1, further comprising at least one intermediate member positioned between said two sides and extending parallel with respect to said two sides, said intermediate member being constructed of graphite and being provided with a groove means and a ceramic layer which are of the same construction as said groove means and said ceramic layer provided in said two sides, respectively.

12. The tool of claim 11, wherein each of said two sides has a cut portion in a lower portion thereof, said cut portion being cut upward such that, when a plurality of said tools are piled in a vertical direction, the cut portion formed in the upper tool receives therein one portion, of the composite camshaft being supported by the lower tool, protruding upward from a plane including upper surfaces of the two sides of the lower tool, and wherein said intermediate member has a cut portion in a lower portion thereof, said cut portion formed in said intermediate member being of the same construction as said cut portion formed in each of said two sides.

* * * * *